United States Patent
Brinkman

(10) Patent No.: US 6,579,406 B2
(45) Date of Patent: Jun. 17, 2003

(54) HOT MELT ADHESIVE

(75) Inventor: Larry Frank Brinkman, Woodstock, IL (US)

(73) Assignee: Rohm and Haas Company, Philadelphia, PA (US)

( * ) Notice: Subject to any disclaimer, the term of this patent is extended or adjusted under 35 U.S.C. 154(b) by 69 days.

(21) Appl. No.: 09/843,706

(22) Filed: Apr. 27, 2001

(65) Prior Publication Data

US 2002/0033228 A1 Mar. 21, 2002

Related U.S. Application Data

(60) Provisional application No. 60/203,303, filed on May 10, 2000.

(51) Int. Cl.$^7$ .......................... B29C 65/40; C08L 75/04; C09J 4/00; C09J 5/00
(52) U.S. Cl. ...................................... 156/331.4; 525/131
(58) Field of Search ........................ 525/131; 156/331.4

(56) References Cited

U.S. PATENT DOCUMENTS

| | | | |
|---|---|---|---|
| 2,894,938 A | 7/1959 | Chapin et al. | |
| 2,940,946 A | 6/1960 | Shokal et al. | |
| 4,999,407 A | 3/1991 | Gilch et al. | |
| 5,153,261 A | 10/1992 | Brooks | |
| 5,173,538 A | 12/1992 | Gilch et al. | |
| 5,296,544 A | 3/1994 | Heise et al. | |
| 5,395,888 A | * 3/1995 | Franke et al. | 525/131 |
| 5,521,249 A | * 5/1996 | Guo | 525/131 |
| 5,886,114 A | 3/1999 | Guo | |
| 5,994,493 A | 11/1999 | Krebs | |
| 6,001,910 A | 12/1999 | Blumenthal et al. | |
| 6,136,136 A | * 10/2000 | Heider | |
| 6,410,627 B1 | * 6/2002 | Paul et al. | |

FOREIGN PATENT DOCUMENTS

| | | |
|---|---|---|
| WO | WO 98/58003 | 12/1998 |
| WO | WO 99/61494 | 12/1999 |

* cited by examiner

Primary Examiner—Steven D. Maki
(74) Attorney, Agent, or Firm—Ronald D. Bakule

(57) ABSTRACT

A moisture reactive hot melt adhesive composition formed by admixing components including a polyisocyanate, an amorphous polyol and 0.1 to 10%, by weight based on the weight of the adhesive composition, of certain styrene/allyl alcohol copolymers, wherein the ratio of NCO/OH groups of the components on an equivalents basis is from 1.05 to 2.5, the components being free from crystalline polyesters and polyethers and the components containing less than 1%, by weight based on the total weight of the components, of water is provided. Also a method for forming the adhesive composition and a method for bonding two substrates using the adhesive are provided.

3 Claims, No Drawings

HOT MELT ADHESIVE

CROSS REFERENCE TO RELATED PATENT APPLICATIONS

This is a non-provisional application of prior pending U.S. provisional application serial No. 60/203,303 filed May 10, 2000.

This invention relates to a hot melt adhesive composition, particularly a moisture reactive hot melt adhesive composition, a method for forming the adhesive composition, a method for bonding substrates, such as structural components, using the adhesive composition. More particularly this invention relates to a hot melt adhesive composition formed by admixing a polyisocyanate, an amorphous polyol, and 0.1 to 10%, by weight based on the weight of the adhesive composition, of certain styrene/allyl alcohol copolymers.

Hot melt adhesives are known to be desirable for their quick setting and for the absence of aqueous or solvent media which provide fluidity to other types of adhesives. Moisture reactive hot melt adhesives which are based on an isocyanate group-containing urethane prepolymer can be designed to yield a relatively low melt viscosity for facile handling and application; reaction with moisture augments the final properties of the adhesive. However, adhesive strength prior to completion of the reaction with moisture which is known in the art as "green strength" may be inadequate for necessary early handling of formed laminates. In such cases it has been disclosed to use low viscosity hot melt adhesives which via incorporation of crystalline polyesters or polyethers such as, for example, hexanediol adipates, polycaprolactones, and polytetramethyl ethylene glycol in the urethane prepolymers can crystallize during cooling after application to a substrate, thereby augmenting green strength. But many of the crystalline polyesters and polyethers are expensive and/or prone to hydrolytic attack over time.

U.S. Pat. No. 4,999,407 discloses a quick-setting hot melt polyurethane composition which is a mixture of at least two amorphous polyurethane prepolymers, preferably a first polyurethane prepolymer having a Tg above room temperature and a second polyurethane prepolymer a Tg below room temperature The problem faced by the inventor is the provision of an alternative moisture reactive hot melt adhesive composition containing a polyurethane prepolymer free from the reacted residues of crystalline polyester or polyether precursors and which provides effective bonding of substrates. Surprisingly, the inventor found that the incorporation of 0.1 to 10%, by weight based on the weight of the adhesive composition, of certain styrene/allyl alcohol addition copolymers into a polyurethane prepolymer-forming reaction mixture containing amorphous polyesters or polyethers and free from crystalline polyesters and polyethers provided the desired balance of properties.

According to a first aspect of the present invention there is provided a moisture reactive hot melt adhesive composition formed by admixing components including a polyisocyanate, an amorphous polyol, and 0.1 to 10%, by weight based on the weight of the adhesive composition, styrene/allyl alcohol copolymer having a hydroxyl number of 100–300 and Mn of 1,000–4,000, wherein the ratio of isocaynate groups/hydroxyl groups ("NCO/OH groups") of the components on an equivalents basis is from 1.05 to 2.5, the components being free from crystalline polyesters and polyethers and the components containing less than 1%, by weight based on the total weight of the components, water.

According to a second aspect of the present invention there is provided a method for forming a moisture reactive hot melt adhesive by admixing components including a polyisocyanate, an amorphous polyol, and 0.1 to 10%, by weight based on the weight of the adhesive composition, styrene/allyl alcohol copolymer having a hydroxyl number of 100–300 and Mn of 1,000–4,000, wherein the ratio of NCO/OH groups of the components on an equivalents basis is from 1.05 to 2.5, the components being free from crystalline polyesters and polyethers and the components containing less than 1%, by weight based on the total weight of the components, water.

According to a third aspect of the present invention there is provided a method for bonding substrates by forming a moisture reactive hot melt adhesive including admixing components including a polyisocyanate, an amorphous polyol, and 0.1 to 10%, by weight based on the weight of the adhesive composition, styrene/allyl alcohol copolymer having a hydroxyl number of 100–300 and Mn of 1,000–4,000, wherein the ratio of NCO/OH groups of the components on an equivalents basis is from 1.05 to 2.5, the components being free from crystalline polyesters and polyethers and the components containing less than 1%, by weight based on the total weight of the components, water; heating the adhesive to a temperature of 50° C. to 160° C.; applying the heated hot melt adhesive to a first substrate in the presence of moisture; contacting the applied heated hot melt adhesive with a second substrate; and cooling, or allowing to cool, the adhesive.

The composition of this invention is a moisture reactive hot melt adhesive composition. By "moisture reactive" is meant herein that the composition contains isocyanate groups which are capable of reacting with water desirably to effect an increase in the molecular weight of the adhesive composition and/or effect crosslinking of the adhesive composition so as to increase the strength properties of the adhesive subsequent to being contacted with water. By "hot melt" is meant herein that the adhesive which may be a solid, semi-solid or viscous mass can be advantageously heated to provide a fluid adhesive of a viscosity suitable for application to and adhesion to substrates.

The moisture reactive hot melt adhesive composition of the present invention is formed by admixing components which include a polyisocyanate, i.e., an isocyanate bearing at least two isocyanate groups. Polyisocyanates which may be used include aromatic, aliphatic, cycloaliphatic polyisocyanates and combinations thereof, such as, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4"-triphenylmethane triisocyanate, polymethylene polyphenylene polyisocyanate, 2,4,6-toluene trilsocyanate, and 4,4'-dimethyl-diphenylmethane tetraisocyanate, or prepolymers having Mn less than 2000 and bearing at least two isocyanate groups. Preferred is a mixture of 4,4'-diphenylmethane diisocyanate and 2,4-diphenylmethane diisocyanate.

The moisture reactive hot melt adhesive composition of the present invention is formed by admixing components which include an amorphous polyol, by which is meant a polyol bearing two or more hydroxyl groups, which polyol does not crystallize under ambient conditions. Amorphous polyols such as amorphous polyesters and amorphous polyethers, polyester/polyethers having both ester and ether linkages, and mixtures thereof may be used. The amorphous polyols preferably have a weight average molecular weight ("Mw") as measured by gel permeation chromatograph, from 250 to 8,000, more preferably from 250 to 3,000 and preferably have an acid number less than 5, more preferably less than 2. Amorphous polyester polyols are preferably aromatic such as those formed from phthalic anhydride and diethylene glycol. Amorphous polyether polyols may be prepared by the reaction of an alkylene oxide with a polyhydric alcohol.

The moisture reactive hot melt adhesive composition of the present invention is formed by admixing components which include 0.1 to 10%, by weight based on the weight of the polyol, of a styrene/allyl alcohol addition copolymer having a hydroxyl number of 100–300 and Mn of 1,000–4,000. Such copolymers are commercially available from Lyondell Chemical, Houston, Tex. such as SAA-100, disclosed to be 70 styrene/30 allyl alcohol, on a molar basis, and SAA-103, disclosed to be 80 styrene/20 allyl alcohol, on a molar basis. By "styrene/allyl alcohol addition copolymer" herein is mean a copolymer containing at least 90 weight percent of copolymerized residues of styrene and allyl alcohol but not excluding other copolymerized monomer(s) to an extent of less than 10 weight percent based on the weight of the copolymer. Without being bound by mechanism, it is believed that the styrene/allyl alcohol copolymer which has, at ambient temperature, crystalline properties, may induce sufficient ordering in the adhesive composition into which it is incorporated to effect a useful level of green strength prior to the reaction of the adhesive with moisture. Accordingly, it is contemplated that other copolymer compositions having a hydroxyl number of 100–300 and Mn of 1,000–4,000 and exhibiting crystalline properties at ambient temperature will also be useful in the moisture reactive hot melt adhesive composition and method for bonding substrates of this invention.

The ratio of NCO/OH groups from all of the admixed components taken on an equivalents basis is from 1.05 to 2.5, preferably from 1.1 to 2.0 in order to provide an adhesive composition with an excess of isocyanate groups. The components are free from crystalline polyesters and polyethers. The components contain less than 1% water, preferably less than 0.2% water, by weight based on the total weight of the components.

The components are mixed by conventional means, preferably in an inert, dry atmosphere, and reacted, preferably at a temperature of 50° C. to 120° C., preferably for a time sufficient to achieve a hydroxyl number of less than 25, more preferably for a time sufficient to achieve a hydroxyl number of less than 5. The styrene/allyl alcohol addition copolymer is preferably solubilized by heating and mixing with at least one of the non-isocyanate containing components before the reaction with the polyisocyanate. Optionally, a catalyst such as, for example, a tertiary amine or a tin-based catalyst may be admixed with the components at a level of less than 0.3% by weight based on the total weight of the admixed components, either before, during, or after the reaction to form the adhesive composition. The adhesive composition of this invention, which is a NCO-functional adhesive, is stored, preferably under an inert, dry atmosphere until use.

The hot melt adhesive composition may be formulated by admixing additional conventional ingredients such as fillers, pigments, tackifiers, plasticizers, rheology modifiers, thermoplastic acrylic resins, etc. with due regard to the reactivity of the NCO-functional groups which are desirably maintained.

In the method for bonding substrates of the present invention the moisture reactive hot melt adhesive is heated to a temperature of 50–160° C., preferably to a temperature of 100° C. to 150° C., in order to achieve a viscosity suitable for transporting the adhesive, such as by pumping or gravity feed, to the application equipment and for the application of the adhesive to a first substrate in the presence of moisture. The application of the adhesive may be effected by conventional means such as, for example, heated spray applicator, heated bead applicator, heated nozzle, and heated roll coater, to form a continuous or discontinuous film of adhesive, as desired. The adhesive may typically be applied at a level of 3.7 to 18.6 kg/sq. meter (4–20 g/sq ft) although in cases where one of the substrates is a fabric it may be applied at a level as low as 1–40 g/sq. meter. It is contemplated that the moisture, i.e., water, which is anticipated to effect reaction with the NCO-functional groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other NCO-functional group-reactive ingredients such as, for example, amines.

Then, the applied adhesive is contacted by a second substrate to provide a laminate construction. The laminate construction so formed is optionally subjected to applied pressure such as by passing it between rollers to effect increased contact of the substrates with the adhesive and the laminate construction is then cooled or allowed to cool. In another embodiment the adhesive may be simultaneously or sequentially applied to both surfaces of the first substrate which adhesive are then simultaneously or sequentially bonded to two further substrates, which may be the same or different. It is further contemplated that the laminate construction may subsequently be bonded to other substrate(s) using the same or a different adhesive before or after the process described herein. The first and second substrates to be bonded in the method of this invention may be the same or different and include, for example, metal, wood, consolidated wood products, paper, woven and nonwoven fabrics, and plastics which may have smooth or structured surfaces and are provided in the form of rolls, sheets, films, foils, etc. They include, for example, lauan mahogany plywood, impregnated paper, extruded polstyrene foam, expanded polystyrene foam, fiberglass reinforced polyester, polyester fabric, high or low pressure laminate, plywood, aluminum, steel, PVC, and engineering plastics.

The following examples are presented to illustrate the invention and the results obtained by the test procedures.
Abbreviations
MDI=diphenylmethane diisocyanate
DEG-PA=diethyleneglycol-phthalic anhydride
PPG=polypropylene glycol
FRP=fiberglass reinforced polyester

EXAMPLE 1

Preparation of Hot Melt Adhesive Composition of the Invention

A one liter reaction vessel was set up with, a gas inlet tube, thermometer, stirrer and a heating jacket. 12 g. 70 styrene/30 allyl alcohol (molar ratios) copolymer (Mn=1500; hydroxyl number=210) (Lyondell Chemicals SAA-100), 151.8 g. PPG (Mw=1000) (BASF Corp., Mt. Olive, N.J.), and 54 g. castor oil (Caschem, Bayonne, N.J.) were added to the reaction vessel and the temperature raised to 110° C. with stirring.

After 30 minutes at 110° C. and a vacuum of 28 inches of mercury, the temperature was lowered to 80° C. 136.2 g of a 50/50 mixture of 4,4-MDI and 2,4-MDI (BASF Corp., Mt. Olive, N.J.) was added and the temperature was held at 80–100° C. for one hour with stirring and under 28 inches of mercury. 246 g. of DEG-PA polyester (Mw=2000)(Stepan Chemical, Northfield, Ill.) was added and the reaction temperature was held at 80–100° C. for an additional hour with stirring under vacuum of 28 inches of mercury. At this time the reaction product was poured from the vessel hot, into a container which was then blanketed in dry nitrogen and sealed.

The product had the following properties:

| | |
|---|---|
| % free isocyanate | 2.36% |
| Viscosity at 120° C. | 8300 cps |
| Color | Slight amber, opaque |
| Mn(by GPC) = 8150 | |

The cured free film of the product had the following properties: (after 7 days at 21.1° C. (70° F.), 50% Relative Humidity)
1583 psi tensile strength
599% elongation
219 psi modulus

EXAMPLE 2

Preparation of Hot Melt Adhesive Composition of the Invention

A hot melt adhesive was prepared according to the process of Example 1 with materials as presented below.
13.0 g Styrene/allyl alcohol copolymer (Lyondell Chemicals SAA-100)
130.0 g PPG (Mw=1000)
19.5 g Castor oil
136.5 g 50/50 blend of 4,4- and 2,4-MDI
351.0 g DEG-PA polyester (Mw=2000)

EXAMPLE 3

Preparation of Hot Melt Adhesive

A hot melt adhesive was prepared according to the process of Example 1 with materials as presented below with the addition of a non-reactive, thermoplastic, styrene/α-methyl styrene resin reinforcing resin. The resin was added with the initial charge materials and brought into solution with heat and stirring as in Example 1.
10 g Styrene/allyl alcohol copolymer (Lyondell Chemicals SAA-100)
100 g PPG (Mw=1000)
15 g Castor oil
105 g 50/50 blend of 4,4- and 2,4-MDI
270 g DEG-PA polyester (Mw=2000) 30 g Styrene/α-methyl styrene resin

EXAMPLE 4

Preparation of Hot Melt Adhesive

A hot melt adhesive was prepared according to the method of Example 3 with a different styrene/allyl alcohol copolymer with materials as presented below. 10 g (80 styrene/20 allyl alcohol, molar basis) copolymer (Mn=3200; hydroxyl number=125) (Lyondell Chemical SAA-103)
101.5 g PPG (Mw=1000)
15 g Castor oil
103.5 g 50/50 blend of 4,4- and 2,4-MDI
270 g DEG-PA polyester (Mw=2000)
30 g. Styrene/α-methyl styrene resin

EXAMPLE 5

Preparation of Hot Melt Adhesive

A hot melt adhesive was prepared according to the process of Example 3 with the addition of an additional hydroxyl polymer which was added with the inital charge.
10 g Styrene/allyl alcohol copolymer (Lyondell Chemical SAA-103)
91.5 g PPG (Mw=1000)
15 g Castor oil
10 g Hydroxyl-terminated polybutadiene (Mw=2700)
103.5 g 50/50 blend of 4,4- and 2,4-MDI
270 g DEG-PA polyester (Mw=2000)
30 g Styrene/α-methyl styrene resin

EXAMPLE 6

Preparation of Hot Melt Adhesive

A hot melt adhesive was prepared according to the process of Example 2 with higher molecular weight polypropylene glycol.
12 g Styrene allyl alcohol copolymer (Lyondell Chemicals SAA-100)
114 g Polypropylene glycol (Mw=2000)
18 g Castor oil
114 g 50/50 blend of 4,4-and 2,4-MDI
342 g DEG-PA ester (Mw=2000)

EXAMPLE 7

Bonding Substrates with Hot Melt Adhesive

A 1.22 meter (four foot) wide hot melt roll coater with an upper and lower set of rolls was allowed to preheat to 126.7° C. (260° F.). A doctor roll was used to adjust the coating thickness by adjusting the gap between the doctor roll and the applicator roll. Spring-loaded end seals contacted the ends of both doctor and applicator rolls to form a well for the adhesive. This set of rolls was then lowered to contact the substrate to be coated. The lower applicator roll contacted the bottom of the substrate. When power was supplied to the rolls, they pulled the first substrate through and coated it. A second substrate was placed on the adhesive by hand and the laminate was run through a rotary press which forced the adhesive into positive contact with the second substrate. The laminate was set aside to moisture cure. Green strength was tested by observing lifting or pulling apart of the substrates (due to memory or warp or twisting when the laminate was moved).

The hot melt adhesive of Example 1 was applied to a series of first substrates at 11.5–12 g/sq ft, except for textured aluminium where adhesive was applied at a level of 15 g/sq ft, and then contacted with a second substrate as described above to form laminates. 3 inch strips of the laminates were peeled back by hand after 24 or 48 hours at 21.1° C. (70° F.) and 50% Relative Humidity.

Data are presented in Table 7.1

TABLE 7.1

Evaluation of adhesive of Example 1

| Laminate construction | Failure after 24 hours | Failure after 48 hours |
|---|---|---|
| FRP/fluted PE/FRP | 100% cohesive | 100% cohesive |
| smooth aluminum/lauan | 100% wood | 100% wood |
| textured Al/plywood | 50% wood | 80% wood |
| white poly/Dow foam | 100% foam | 100% foam |
| gray poly/plywood | 90% wood | 95% wood |
| textured Al/Dow foam | 20% foam | 30% foam |
| smooth Al/Dow foam | 25% foam | 50% foam |
| FRP/plywood | 100% wood | 100% wood |
| smooth Al/PE/smooth Al | 100% cohesive | 100% cohesive |
| FRP/Celotex (foil) | 100% foil to Celotex | 100% foil to Celotex |

Bonding two substrates by the method of this invention using the adhesive composition of Example 1 of this invention was successfully effected for a variety of substrates.

EXAMPLE 8

Bonding Substrates with Hot Melt Adhesive

FRP and lauan were bonded with the adhesive composition of Example 1 according to the method of Example 7. Tensile shear and flatwise tensile after aging for 7 days at 21.1° C. (70° F.) and 50% Relative Humidity are presented in Tables 8.1 and 8.2 below.

TABLE 8.1

Tensile shear data

| Temperature | Averager Tensile Shear (psi) | Type of Failure |
|---|---|---|
| 23.9° C. (75° F.) | 256 | Lauan failure |
| 48.9° C. (120° F.) | 500 | Lauan failure |
| 71.1° C. (160° F.) | 412 | Adhesive failure |

TABLE 8.2

Flatwise tensile data

| Temperature | Average tensile (psi) |
|---|---|
| 71.1° C. (160° F.) | 117 |
| 82.2° C. (180° F.) | 84 |

What is claimed is:

1. A moisture reactive hot melt adhesive composition formed by admixing components comprising a polyisocyanate, an amorphous polyol and 0.1 to 10%, by weight based on the weight of said adhesive composition, styrene/allyl alcohol copolymer having a hydroxyl number of 100–300 and Mn of 1,000–4,000, wherein the ratio of NCO/OH groups of said components on an equivalents basis is from 1.05 to 2.5, said components being free from crystalline polyesters and polyethers and said components containing less than 1%, by weight based on the total weight of said components, water.

2. A method for forming a moisture reactive hot melt adhesive comprising admixing components comprising a polyisocyanate, an amorphous polyol, and 0.1 to 10%, by weight based on the weight of said adhesive composition, styrene/allyl alcohol copolymer having a hydroxyl number of 100–300 and Mn of 1,000–4,000, wherein the ratio of NCO/OH groups of said components on an equivalents basis is from 1.05 to 2.5, said components being free from crystalline polyesters and polyethers and said components containing less than 1%, by weight based on the total weight of said components, water.

3. A method for bonding substrates comprising forming a moisture reactive hot melt adhesive comprising admixing components comprising a polyisocyanate, an amorphous polyol and 0.1 to 10%, by weight based on the weight of said adhesive composition, styrene/allyl alcohol copolymer having a hydroxyl number of 100–300 and Mn of 1,000–4,000, wherein the ratio of NCO/OH groups of said components on an equivalents basis is from 1.05 to 2.5, said components being free from crystalline polyesters and polyethers and said components containing less than 1%, by weight based on the total weight of said components, water;

heating said adhesive to a temperature of 50° C. to 160° C.;

applying said heated hot melt adhesive to a first substrate in the presence of moisture;

contacting said applied heated hot melt adhesive with a second substrate; and cooling, or allowing to cool, said adhesive.

* * * * *